United States Patent
Sawada et al.

(10) Patent No.: US 10,224,535 B2
(45) Date of Patent: Mar. 5, 2019

(54) RECTANGULAR SECONDARY BATTERY

(71) Applicant: Hitachi Automotive Systems, Ltd., Hitachinaka-shi, Ibaraki (JP)

(72) Inventors: Keisuke Sawada, Hitachinaka (JP); Kazuaki Urano, Hitachinaka (JP); Takuro Tsunaki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 367 days.

(21) Appl. No.: 15/038,540

(22) PCT Filed: Dec. 25, 2013

(86) PCT No.: PCT/JP2013/084671
§ 371 (c)(1),
(2) Date: May 23, 2016

(87) PCT Pub. No.: WO2015/097785
PCT Pub. Date: Jul. 2, 2015

(65) Prior Publication Data
US 2016/0293931 A1    Oct. 6, 2016

(51) Int. Cl.
*H01M 2/12*    (2006.01)
*H01M 2/26*    (2006.01)
(Continued)

(52) U.S. Cl.
CPC .......... *H01M 2/345* (2013.01); *H01M 2/043* (2013.01); *H01M 2/0404* (2013.01);
(Continued)

(58) Field of Classification Search
None
See application file for complete search history.

(56) References Cited

U.S. PATENT DOCUMENTS

| 8,435,660 B2 | 5/2013 | Kim et al. |
| 2008/0038627 A1 | 2/2008 | Yamauchi et al. |

(Continued)

FOREIGN PATENT DOCUMENTS

| JP | 2008-66254 A | 3/2008 |
| JP | 2012-119183 A | 6/2012 |

(Continued)

OTHER PUBLICATIONS

International Search Report (PCT/ISA/210) issued in PCT Application No. PCT/JP2013/084671 dated Apr. 8, 2014 with English translation (Four (4) pages).

(Continued)

*Primary Examiner* — Jonathan Crepeau
(74) *Attorney, Agent, or Firm* — Crowell & Moring LLP

(57) ABSTRACT

A rectangular secondary battery (1) includes a current interrupting portion (60) disposed in a current path between a collector plate (21) connected to a rolled electrode group (40) and an external terminal (61) disposed outside a battery container (2) and configured to interrupt the current path when an internal pressure of the battery container (2) is increased. The current interrupting portion (60) has a diaphragm (68) electrically connected to the external terminal (61) and deformed when the internal pressure of the battery container (2) is increased, a connection plate (24) connected to the diaphragm and disconnected from the diaphragm by the deformation of the diaphragm, and a connecting portion (23) connecting the connection plate and collector plate. A rigidity of the connecting portion (23) is lower than that of the collector plate (21).

8 Claims, 8 Drawing Sheets

(51) Int. Cl.
   *H01M 2/34* (2006.01)
   *H01M 2/04* (2006.01)
(52) U.S. Cl.
   CPC ....... *H01M 2/0473* (2013.01); *H01M 2/1229* (2013.01); *H01M 2/263* (2013.01); *H01M 2200/20* (2013.01); *H01M 2220/20* (2013.01)

(56) References Cited

U.S. PATENT DOCUMENTS

| | | |
|---|---|---|
| 2010/0167107 A1 | 7/2010 | Byun et al. |
| 2010/0167116 A1 | 7/2010 | Okada |
| 2012/0308855 A1 | 12/2012 | Shimizu et al. |
| 2013/0196185 A1* | 8/2013 | Yokoyama ............. H01M 2/06 429/53 |
| 2014/0141296 A1 | 5/2014 | Nakai |
| 2015/0171412 A1 | 6/2015 | Matsumoto et al. |
| 2015/0303441 A1 | 10/2015 | Takagi |

FOREIGN PATENT DOCUMENTS

| | | |
|---|---|---|
| JP | 2013-164923 A | 8/2013 |
| JP | 2014-53175 A | 3/2014 |
| WO | WO 2011/102368 A1 | 8/2011 |
| WO | WO 2013/014762 A1 | 1/2013 |
| WO | WO 2013/076831 A1 | 5/2013 |

OTHER PUBLICATIONS

Japanese-language Written Opinion (PCT/ISA/237) issued in PCT Application No. PCT/JP2013/084671 dated Apr. 8, 2014 (Four (4) pages).

Extended European Search Report issued in counterpart European Patent Application No. 13900479.0 dated Jul. 10, 2017 (five (5) pages).

* cited by examiner

RECTANGULAR SECONDARY BATTERY

TECHNICAL FIELD

The present invention relates to a rectangular secondary battery for vehicle or the like.

BACKGROUND ART

Conventionally, in the field of rechargeable secondary batteries, aqueous system batteries such as a lead battery, a nickel-cadmium battery, and a nickel-hydrogen battery were mainstream. However, along with reduction in size and weight of electrical devices, a lithium-ion secondary battery having a high energy density has begun to attract attention, and study, development, and commercialization thereof are now advanced rapidly. Further, under circumstances where global warming or exhaustion of resources come to light, an electric vehicle (EV) and a hybrid electric vehicle (HEV) having a mechanism where a driving force is partially assisted by an electric motor are developed by automobile manufacturers, and a secondary battery having large capacity and high output is required as a power supply for the EV and HEV.

As a power supply matching such requirements, a high voltage lithium-ion secondary battery of a non-aqueous system is now attracting attention. In particular, a rectangular lithium-ion secondary battery having a battery container with a flat-box shape has high volumetric efficiency when being packed and is thus increasingly demanded as a power supply to be mounted in the HEV, EV, or other equipment. In the rectangular secondary battery having such a sealed type battery container, a pressure inside the battery container may be increased due to, for example, overcharge, excessive temperature rise, or breakage by an external force.

There is known a non-aqueous electrolyte secondary battery provided with a current interrupting mechanism of interrupting current in the above case (see, for example, PTL 1). A non-aqueous electrolyte secondary battery described in PTL 1 has a fragile portion that is ruptured when a pressure inside an exterior can is increased to thereby interrupt electrical conduction. The fragile portion is connected, at its center portion, to a surface of a diaphragm that faces inside the battery, and a peripheral portion thereof is connected to a collector tab positioned below the diaphragm. When the diaphragm is deformed to be lifted up, the fragile portion is ruptured to interrupt electrical conduction to the diaphragm.

CITATION LIST

Patent Literature

PTL 1: JP 2008-66254 A

SUMMARY OF INVENTION

Technical Problem

In the non-aqueous electrolyte secondary battery described in PTL 1, the diaphragm is disposed on a surface of a tab receiving portion that faces outside the battery so as to cover a holder hole, and furthermore, its central bottom surface is adhered to be electrically conductive to the fragile portion through the holder hole. Thus, a gas pressure in the battery is applied to the surfaces of the fragile portion and diaphragm that face inside the battery. With this structure, there is provided a non-aqueous electrolyte secondary battery having a current interrupting mechanism excellent in impact resistance and vibration resistance.

However, in the non-aqueous electrolyte secondary battery described in PTL 1, when an electrode body inside an exterior can is vibrated or swung by impact or vibration applied from outside, vibration is directly transmitted from a collector plate connecting portion of a collector tab member connected to the electrode body to an insertion portion, or stress such as torsion is applied to the insertion portion. As a result, a fragile portion that the insertion portion has may be damaged or ruptured by such vibration or stress applied to the insertion portion to cause malfunction of the current interrupting mechanism.

The present invention has been made in view of the above problem, and an object thereof is to provide a rectangular secondary battery which is excellent in vibration resistance and impact resistance and capable of reliably and stably interrupting a current path when an internal pressure inside a battery container is increased.

Solution to Problem

To attain the above object, a rectangular secondary battery according to the present invention includes a current interrupting portion disposed in a current path between a collector plate connected to a rolled electrode group and an external terminal disposed outside a battery container and configured to interrupt the current path when an internal pressure of the battery container is increased. The current interrupting portion has a diaphragm electrically connected to the external terminal and deformed when the internal pressure of the battery container is increased, a connection plate connected to the diaphragm and disconnected from the diaphragm by the deformation of the diaphragm, and a connecting portion connecting the connection plate and collector plate. A rigidity of the connecting portion is lower than that of the collector plate.

Advantageous Effects of Invention

According to the present invention, the rigidity of the connecting portion is lower than that of the collector plate, so that even if the rolled electrode group and collector plate inside the battery container are vibrated or swung by vibration or impact applied from outside, a relative displacement between the collector plate and connection plate can be allowed by the connecting portion. This can suppress transmission of the vibration from the collector plate to the connection plate, or reduce stress applied from the collector plate to the connection plate, thereby preventing connection between the connection plate and diaphragm from being disconnected by an external factor such as vibration or impact. Thus, there can be provided a rectangular secondary battery excellent in vibration resistance and impact resistance and capable of stably and reliably interrupting the current path when the internal pressure of the battery container is increased.

Other problems, configurations, and effects will be clarified in the description of the following embodiments.

DESCRIPTION OF EMBODIMENTS

An embodiment of a rectangular secondary battery according to the present invention will be described in detail below with reference to the drawings.

Figure 1:
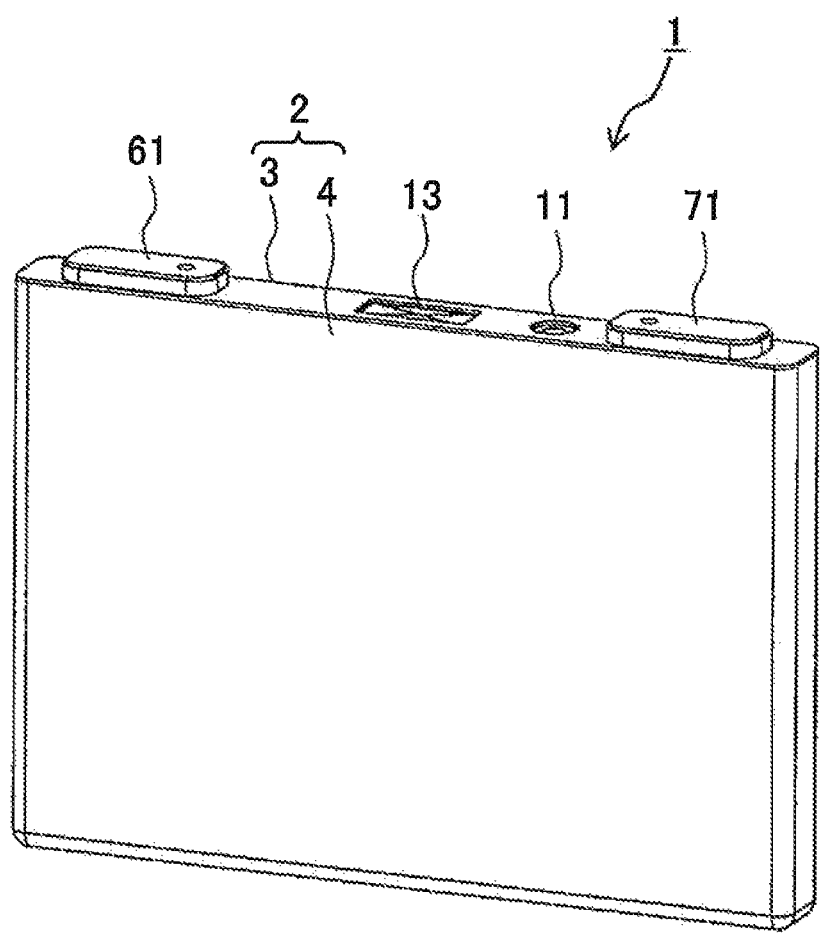
FIG. 1 is a perspective view of a rectangular secondary battery according to a first embodiment of the present invention.
Figure 2:
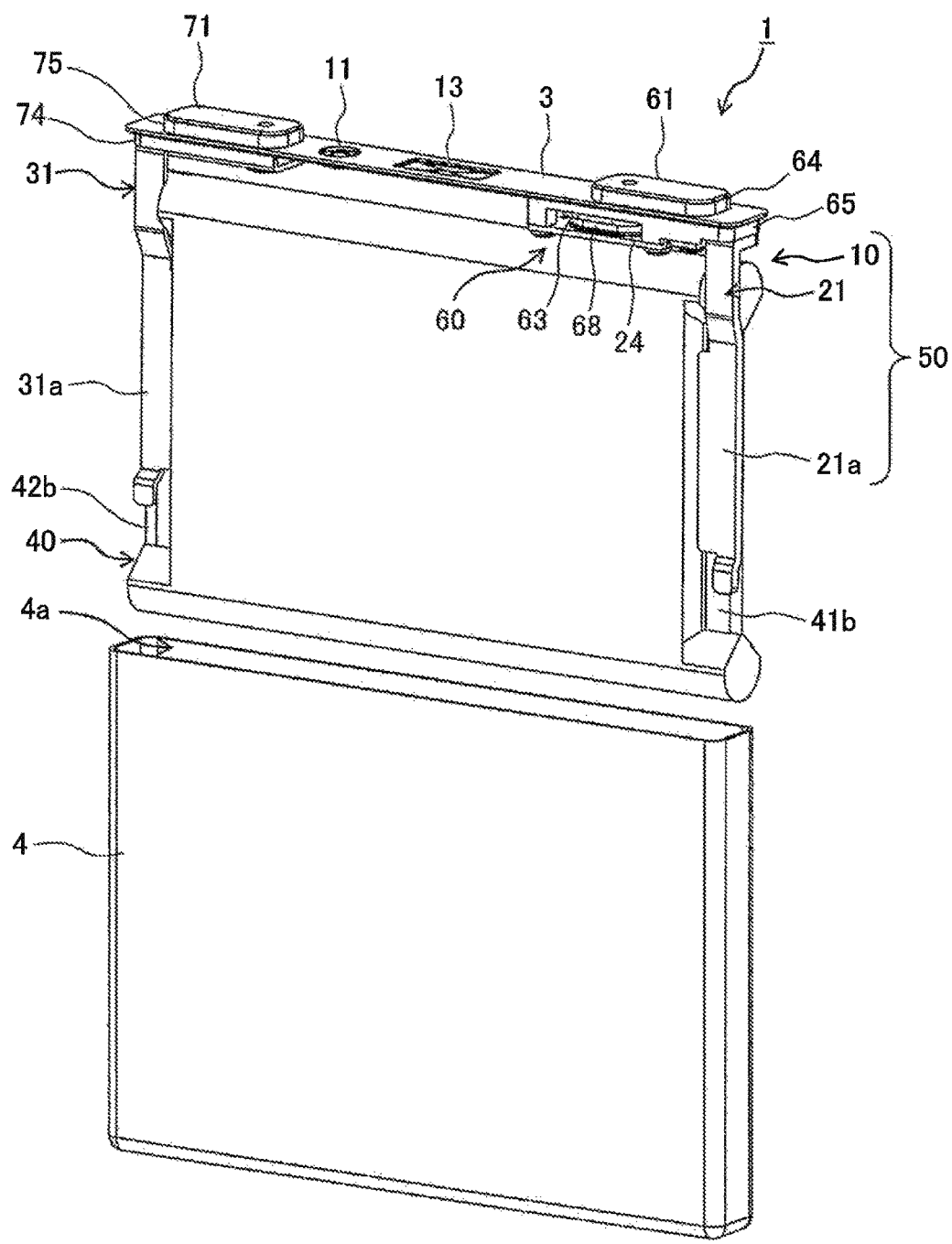
FIG. 2 is an exploded perspective view of the rectangular secondary battery illustrated in FIG. 1.
Figure 3:
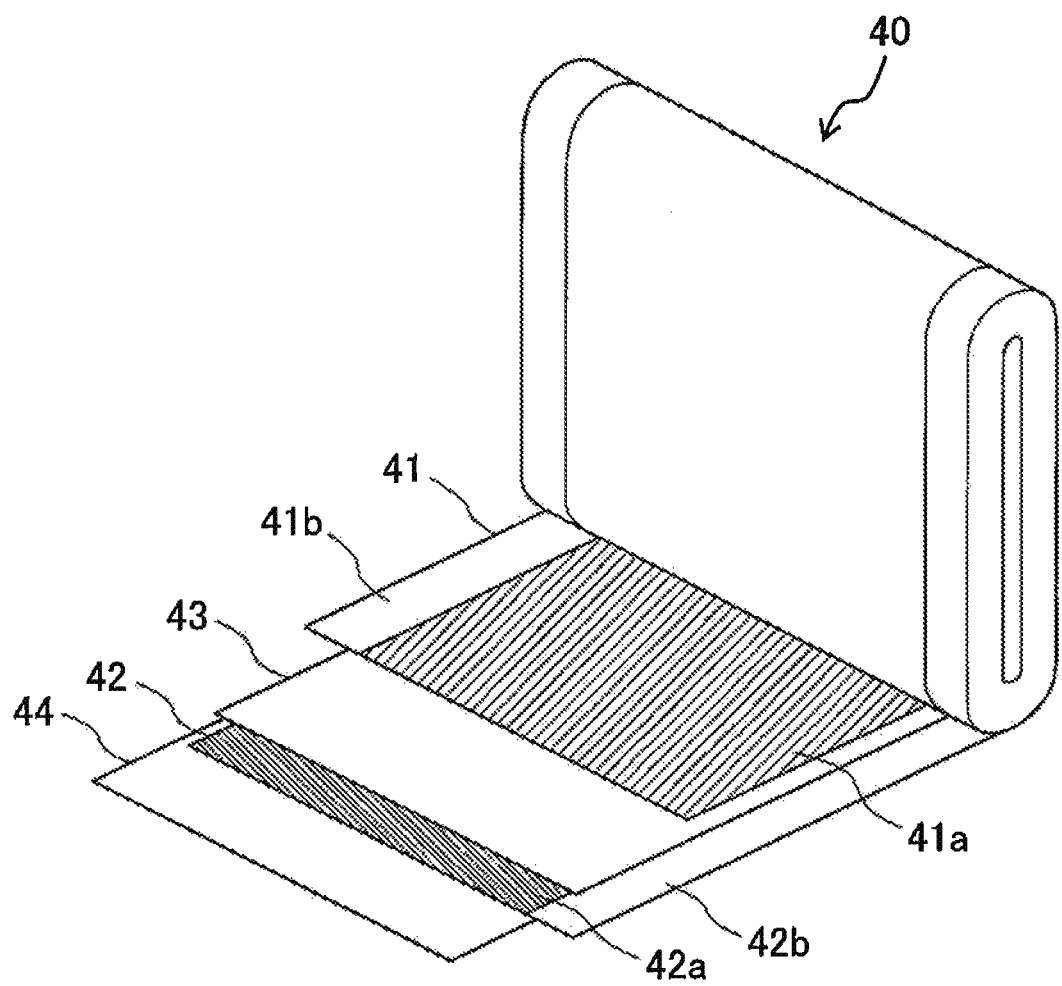
FIG. 3 is an exploded perspective view of a rolled electrode group of the rectangular secondary battery illustrated in FIG. 1.

FIG. 1 is a perspective view of a rectangular secondary battery 1 according to an embodiment of the present invention. FIG. 2 is an exploded perspective view of the rectangular secondary battery 1 illustrated in FIG. 1. FIG. 3 is an exploded perspective view in which a rolled electrode group 40 illustrated in FIG. 2 is partially unrolled.

The rectangular secondary battery 1 is, for example, a lithium-ion secondary battery and has a flat rectangular battery container 2. The battery container 2 is constituted by a rectangular box shaped battery can 4 having an opening portion 4a and a battery lid 3 that closes the opening portion 4a of the battery can 4. Hereinafter, a direction along a long side of the battery lid 3 having a rectangular shape in a plan view is referred to as a longitudinal direction of the battery container 2, and a direction along a short side thereof is referred to as a short direction. The battery can 4 and battery lid 3 are each produced by using, for example, aluminum or an aluminum alloy. The battery lid 3 is joined to the battery can 4 by, for example, laser welding over the entire periphery of the opening portion of the battery can 4, whereby the battery container 2 is sealed. A rolled electrode group 40 is housed inside the battery container 2 with a not illustrated insulating sheet interposed therebetween.

As illustrated in FIG. 3, the rolled electrode group 40 is composed of a rolled laminated body including a positive electrode 41 and a negative electrode 42, which are laminated with separators 43 and 44 interposed therebetween, and is formed into a flat shape. To obtain the rolled electrode group 40, a stripe-shaped laminated body is rolled with a tension load of, for example, about 10 N applied in an extending direction thereof. At this time, the laminated body of the rolled electrode group 40 is rolled while being subjected to meandering control such that both end portions of the respective positive electrode 41, negative electrode 42, and separators 43, 44 in a width direction of the stripe-shaped laminated body, i.e., in a roll axis direction of the stripe-shaped laminated body are situated at fixed positions.

The positive electrode 41 has a positive electrode mixture layer 41a formed on both surfaces of a positive electrode foil and has, at one side edge thereof in the width direction of the rolled electrode group 40, i.e., in the roll axis direction of the rolled electrode group 40, a foil exposed portion 41b where the positive electrode foil is exposed. The negative electrode 42 has a negative electrode mixture layer 42a formed on both surfaces of a negative electrode foil and has, at the other side edge thereof in the width direction of the rolled electrode group 40, i.e., in the roll axis direction of the rolled electrode group 40, a foil exposed portion 42b where the negative electrode foil is exposed. The foil exposed portions 41b and 42b of the respective positive and negative electrodes 41 and 42 are situated at mutually opposite positions in the width direction, i.e., in the roll axis direction.

The positive electrode 41 can be produced, for example, in the following procedure. First, 10 parts by weight of scale-like graphite as a conductive material and 10 parts by weight of polyvinylidene fluoride (hereinafter, referred to as PVDF) as a binder are added to 100 parts by weight of lithium manganate (chemical formula: $LiMn_2O_4$) as a positive electrode active material, followed by addition of N-methyl-pyrrolidone (hereinafter, referred to as NMP) as a dispersing solvent. Then, kneading is performed to thereby produce a positive electrode mixture. The produced positive electrode mixture is applied to both surfaces of an aluminum foil (positive electrode foil) of a thickness of 20 µm except for the foil exposed portion 41b. Thereafter, drying, pressing, and cutting are performed, whereby the positive electrode 41 in which a thickness of the positive electrode mixture layer 41a not including the aluminum foil is, for example, 90 µm can be obtained.

Although the lithium manganate is used as the positive electrode active material in the present embodiment, the positive electrode active material may be another lithium manganate having a spinel crystal structure, a lithium manganese complex oxide partially substituted by or doped with a metallic element, lithium cobaltate having a laminar crystal structure, lithium titanate, or a lithium-metal composite oxide obtained by substitution or doping of some of these substances with metallic elements.

The negative electrode 42 can be produced, for example, in the following procedure. First, 10 parts by weight of PVDF as a binder is added to 100 parts by weight of amorphous carbon powder as a negative electrode active material, followed by addition of NMP as a dispersing solvent. Then, kneading is performed to thereby produce a negative electrode mixture. The produced negative electrode mixture is applied to both surfaces of a copper foil (negative electrode foil) of a thickness of 10 µm except for the foil exposed portion 42b. Thereafter, drying, pressing, and cutting are performed, whereby the negative electrode 42 in which a thickness of the negative electrode mixture layer 42a not including the copper foil is, for example, 70 µm can be obtained.

Although the amorphous carbon is used as the negative electrode active material in the present embodiment, the negative electrode active material is not particularly limited and may be natural graphite allowing insertion and desorption of lithium ions, various artificial graphite materials, carbonaceous materials such as coke, or the like. Further, the form of particles of the negative electrode active material is not particularly limited and may be scaly, spherical, fibrous, and massive forms.

Further, although the PVDF is used as the binder in the present embodiment, the binder may be polytetrafluoroethylene (PTFE), polyethylene, polystyrene, polybutadiene, butyl rubber, nitrile rubber, styrene-butadiene rubber, polysulfide rubber, nitrocellulose, cyanoethyl cellulose, various latexes, acrylonitrile, vinyl fluoride, vinylidene fluoride, propylene fluoride, chloroprene fluoride, a polymer such as an acrylic resin, and a mixture of these substances.

The separators 43 and 44 are each formed of a polyethylene insulating material having a microporous property and each have a role of insulating the positive and negative electrodes 41 and 42 from each other. The negative electrode mixture layer 42b of the negative electrode 42 is larger in size than the positive electrode mixture layer 41a of the positive electrode 41 in the width direction and, therefore, the positive electrode mixture layer 41a is completely sandwiched between the negative electrode mixture layers 42a without fail.

The foil exposed portions 41b and 42b of the respective positive and negative electrodes 41 and 42 are bundled at a flat part of the rolled electrode group 40. As illustrated in FIG. 2, the foil exposed portions 41b and 42b are joined and fixed to joint pieces 21a and 31a of flat positive- and negative-electrode collector plates 21 and 31, respectively, which extend from a lower portion of the battery lid 3 to a bottom surface of the battery can 4 in a height direction of the battery container 2, by, for example, resistance welding or ultrasonic welding. As a result, in the rolled electrode group 40, the positive and negative electrodes 41 and 42 are electrically connected to the positive- and negative-electrode collector plates 21 and 31, respectively. Widths of the separators 43 and 44 alternately laminated with the positive and negative electrodes 41 and 42 are larger than that of the negative electrode mixture layer 42a but not large enough to completely cover the foil exposed portions 41b and 42b, allowing the foil exposed portions 41b and 42b to be exposed from opposite sides of the respective separators 43 and 44. Thus, the width sizes of the separators 43 and 44 do not interfere with bundling and welding of the foil exposed portions 41b and 42b.

The positive electrode collector plate 21 is fixed to a lower surface of the battery lid 3 through an insulating member 65 and is disposed inside the battery container 2. A positive electrode external terminal 61 is fixed to an upper surface of the battery lid 3 through an insulating member 64 and is disposed outside the battery container 2. Although details will be described later, a current interrupting portion 60 is provided in a current path between the positive electrode collector plate 21 and positive electrode external terminal 61 (see FIG. 4A). When an internal pressure inside the battery container 2 is increased to a predetermined value, the current interrupting portion 60 interrupts the current path between the positive electrode collector plate 21 and positive electrode external terminal 61 by using the increase in the internal pressure.

The negative electrode collector plate 31 is fixed to the lower surface of the battery lid 3 through an insulating member 74 and is disposed inside the battery container 2. A negative electrode external terminal 71 is fixed to the upper surface of the battery lid 3 through an insulating member 75 and is disposed outside the battery container 2. Although not illustrated, the negative electrode collector plate 31 and negative electrode external terminal 71 are caulked by a connection terminal penetrating the battery lid 3 and are electrically connected to each other through the connection terminal. The negative electrode collector plate 31 and negative electrode external terminal 71 are each produced by using, for example, copper or a copper alloy.

The positive- and negative-electrode external terminals 61, 71 and positive- and negative electrode collector plates 21, 31 are fixed to the battery lid 3 to thereby form a lid assembly 10. Further, the foil exposed portions 41b and 42b of the rolled electrode group 40 are joined and fixed to the joint pieces 21a and 31a, respectively, and the rolled electrode group 40 is supported between the positive- and negative-electrode collector plates 21 and 31, whereby a power generating element 50 is formed.

The battery lid 3 has, between the positive- and negative-electrode external terminals 61 and 71 which are fixed to one and the other ends thereof in the longitudinal direction, an injection hole 11 for injecting an electrolyte solution and a gas exhaust valve 13 which is opened when the pressure inside the battery container 2 is increased to exceed a predetermined value. A non-aqueous electrolyte solution is injected inside the battery container 2 through the injection hole 11 of the battery lid 3, and then an injection plug is joined to the injection hole 11 by, for example, laser welding, whereby the battery container 2 is sealed.

The non-aqueous electrolyte solution to be injected into the battery container 2 may be lithium hexafluorophosphate ($LiPF_6$) dissolved at concentration of 1 mol/l in a mixed solution obtained by mixing ethylene carbonate with dimethyl carbonate at a volume ratio of 1:2. The non-aqueous electrolyte solution is not limited by a specific lithium salt or a specific organic solvent. For example, a non-aqueous electrolyte solution obtained by dissolving a common lithium salt as an electrolyte into an organic solvent may be used.

The electrolyte may be, for example, $LiClO_4$, $LiAsF_6$, $LiBF_4$, $LiB(C_6H_5)_4$, $CH_3SO_3Li$, $CF_3SO_3Li$, or a mixture of these substances. The organic solvent may be propylene carbonate, ethylene carbonate, 1,2-dimethoxyethane, 1,2-diethoxyethane, γ-butyrolactone, tetrahydrofuran, 1,3-dioxolane, 4-methyl-i, 3-dioxolane, diethyl ether, sulfolane, methylsulfolane, acetonitrile, propionitrile, or a mixed solvent containing at least two of these substances, and a mixing ratio thereof is not particularly limited.

(Current Interrupting Portion)

Figure 4A:
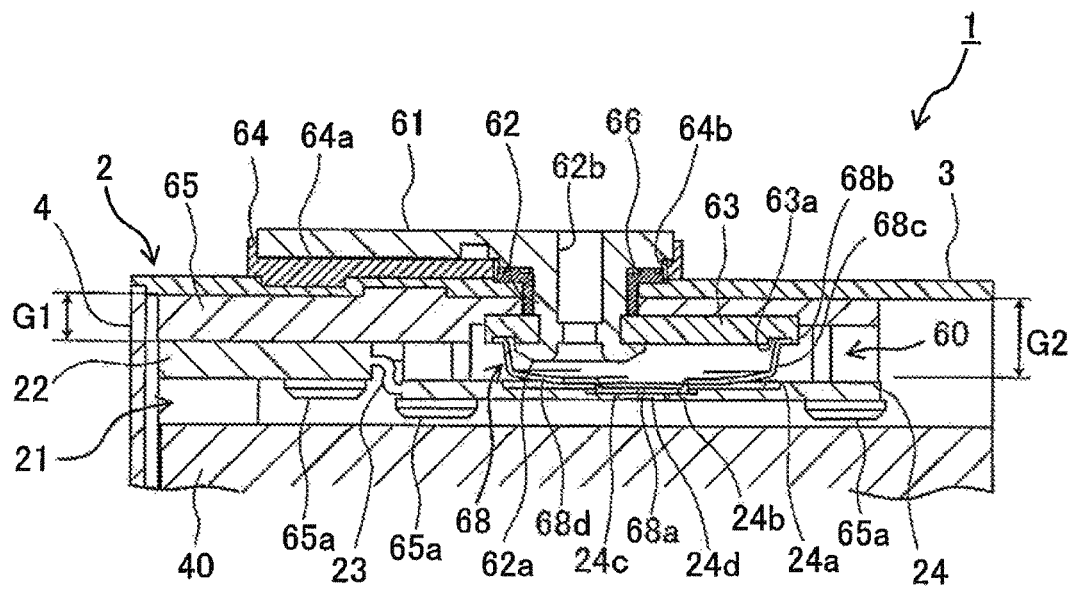
FIG. 4A is an enlarged cross-sectional view of a current interrupting portion of the rectangular secondary battery illustrated in FIG. 1.
Figure 4B:
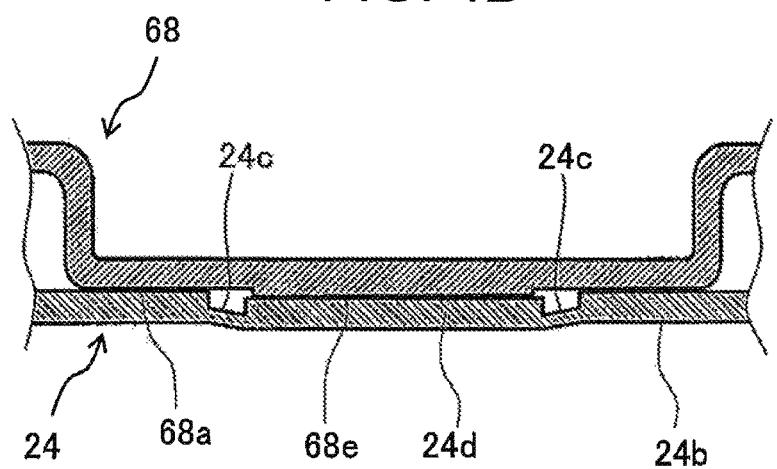
FIG. 4B is an enlarged cross-sectional view of a joint portion of a connection plate joined to a diaphragm illustrated in FIG. 4A.
Figure 5:
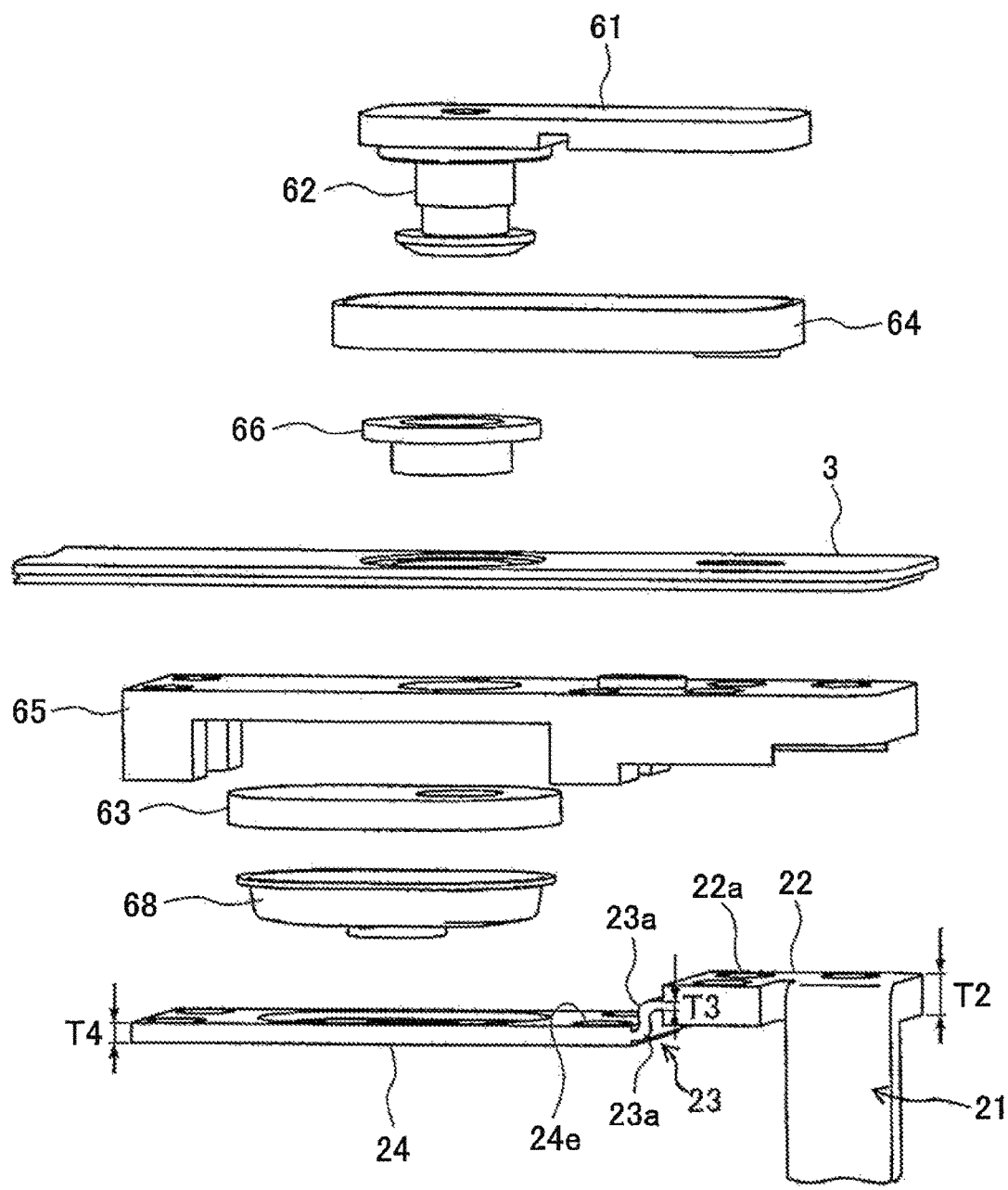
FIG. 5 is an exploded perspective view of the current interrupting portion illustrated in FIG. 4A and members therearound.

FIG. 4 is a cross-sectional view taken along the longitudinal direction of the battery container 2 of the rectangular secondary battery 1 illustrated in FIG. 1, which illustrates, in an enlarged manner, the current interrupting portion 60 and a portion therearound. FIG. 4B is an enlarged view of a joint portion 24d of a connection plate 24 joined to a diaphragm 68 illustrated in FIG. 4A. FIG. 5 is an exploded perspective view of members illustrated in FIG. 4A.

The current interrupting portion 60 of the present embodiment mainly includes a connection plate 24 and a diaphragm 68, which are to be described below. Hereinafter, a configuration of the current interrupting portion 60 will be described in detail.

As described above, the positive electrode collector plate 21 connected to foil exposed portion 41b of the positive electrode 41 of the rolled electrode group 40 is disposed inside the battery container 2 with a flat base portion 22, which is parallel to the battery lid 3, fixed to the lower surface of the battery lid 3 through the insulating member 65. As illustrated in FIG. 5, the positive electrode collector plate 21 has a fixing hole 22a in the flat base portion 22 opposite to the lower surface of the battery lid 3. The fixing hole 22a of the base portion 22 is preferably disposed so as to avoid the shortest path of current flowing in the base portion 22. The insulating member 65 is produced by using a resin material having an insulating property and has fixation convex portions 65a to be inserted into the fixing hole 22a of the base portion 22 of the positive electrode collector plate 21, for example.

The fixation convex portions 65a of the insulating member 65 are each inserted into the fixing hole 22a of the base portion 22, followed by heat welding, whereby the positive electrode collector plate 21 is fixed to the insulating member 65. In this state, the base portion 22 and battery lid 3 are disposed parallel to each other with a gap G1 therebetween. The connection plate 24 is connected to one end of the base portion 22 of the positive electrode collector plate 21 through a connecting portion 23, whereby the positive electrode collector plate 21 and connection plate 24 are electrically connected to each other. The base portion 22 of the positive electrode collector plate 21 is fixed, at its end portion adjacent to the connecting portion 23, to the battery lid 3 through the insulating member 65. The connection plate 24 and connecting portion 23 can be regarded as a part of the positive electrode collector plate 21.

The connection plate 24 is a flat member extending in the longitudinal direction of the battery container 2 and having a rectangular shape in a plan view. Fixing holes 24e are formed on longitudinal direction both ends of the connection plate 24, respectively. The fixing holes 24e of the connection plate 24 are preferably disposed so as to avoid the shortest path of current flowing from the base portion 22 of the positive electrode collector plate 21 to the diaphragm 68 through the connecting portion 23. The fixation convex portions 65a of the insulating member 65 are inserted respectively into the fixing holes 24e of the connection plate 24, followed by heat welding, whereby the longitudinal direction both ends of the connection plate 24 are fixed to the insulating member 65. The connection plate 24 is connected, at its end portion adjacent to the connecting portion 23, to the battery lid 3 through the insulating member 65. The connection plate 24 is disposed parallel to the battery lid 3 with a gap G2 therebetween.

The gap G1 between the base portion 22 of the positive electrode collector plate 21 and battery lid 3 is smaller than the gap G2 between the connection plate 24 and battery lid 3. That is, the connection plate 24 is disposed such that a surface thereof that faces outside the battery container 2 is situated one step lower (toward the inside of the battery container 2) than a surface of the base portion 22 of the positive electrode collector plate 21 that faces outside the battery container 2 and at the same height position as a surface of the base portion 22 of the positive electrode collector plate 21 that faces inside the battery container 2. This provides a step formed between the connection plate 24 and base portion 22 of the positive electrode collector plate 21 in a direction perpendicular to the battery lid 3. The formation of the step ensures, between the battery lid 3 and connection plate 24, a space for providing the diaphragm 68 having a convex shape protruding inside the battery container 2, a conductive plate 63, and insulating member 65.

A stepwise concave portion 24a is formed in the surface of the connection plate 24 that faces outside the battery container 2, and a thin portion 24b is formed in a center portion of the concave portion 24a. The thin portion 24b is a portion recessed into a stepped shape inside the concave portion 24a, which is formed by reducing a thickness of the connection plate 24 to a value less than a thickness of the concave portion 24a. The concave portion 24a and thin portion 24b are thus formed, whereby two steps in a thickness direction perpendicular to the battery lid 3 are formed in the surface of the connection plate 24 that faces outside the battery container 2; on the other hand, the surface of the connection plate 24 that faces inside the battery container 2 is flattened.

The connection plate 24 has, in the thin portion 24b, a joint portion 24d to be joined with a protrusion 68a of the diaphragm 68 and a fragile portion 24c formed around the joint portion 24d. The fragile portion 24c is, for example, an annular groove formed so as to be recessed in a thickness direction of the thin portion 24b. The connection plate 24 has the smallest thickness at a portion where the fragile portion 24c is formed and is easily ruptured there. The fragile portion 24c is formed around the joint portion 24d, that is, it is formed so as to surround the joint portion 24d. Apart of the diaphragm 68 on the inner side of the battery container 2 is housed in the concave portion 24a of the connection plate 24, and the protrusion 68a at a top portion of the diaphragm 68 is joined to the joint portion 24d inside the fragile portion 24c formed in the thin portion 24b inside the concave portion 24a.

The connection plate 24 is fixed, at its end portion adjacent to the connecting portion 23 in the longitudinal direction and an opposite side end portion, to the battery lid 3 of the battery container 2 through the insulating member 65, whereby a part of the connection plate 24 between the joint portion 24d and connecting portion 23 is fixed to the battery lid 3 through the insulating member 65. Further, the joint portion 24d of the connection plate 24 to be joined with the diaphragm 68 is disposed between the longitudinal direction both end portions of the connection plate 24 fixed to the battery lid 3 through the insulating member 65. The connection plate 24 is connected to the base portion 22 of the positive electrode collector plate 21 through the connecting portion 23, whereby the connection plate 24 and positive electrode collector plate 21 are electrically connected to each other.

As illustrated in FIG. 5, the connecting portion 23 is a plate-shaped member connecting the base portion 22 of the positive electrode collector plate 21 and connection plate 24 and bent in a thickness direction thereof into an S-shape. A width of the connecting portion 23 in the short direction of the battery container 2 is preferably larger than at least an interval between the pair of fixing holes 22a and 22a formed at an end portion of the base portion 22 of the positive electrode collector plate 21 on the connecting portion 23 side and larger than an interval between the pair of fixing holes 24e and 24e formed at an end portion of the connection plate 24 on the connecting portion 23 side. More preferably, the width of the connecting portion 23 is equal to a width of the base portion 22 of the positive electrode collector plate 21 and equal to a width of the connection plate 24. Increasing the width of the connecting portion 23 as described above makes it possible to ensure strength of the connecting portion 23 and to reduce an electrical resistance of the connecting portion 23.

The connecting portion 23 has a rigidity lower than that of the positive electrode collector plate 21 and connection plate 24. As illustrated in FIG. 5, in the present embodiment, a thickness T3 of the connecting portion 23 is smaller than a thickness T2 of the base portion 22 of the positive electrode collector plate 21 and a thickness T4 of the connection plate 24. The thickness T3 of the connecting portion 23 can be set to, for example, equal to or more than 0.3 mm and equal to or less than 2.0 mm. The positive electrode collector plate 21, connecting portion 23, and connection plate 24 can each be formed by integrally forging a conductive metal material, such as aluminum or an aluminum alloy, by casting.

The connecting portion 23 has a bent portion 23a between the base portion 22 of the positive electrode collector plate 21 and connection plate 24; however, the thickness T3 thereof is uniform.

The diaphragm 68 has a bowl shape having a hollow inside and formed in a convex shape protruding inside the battery can 4. A planar shape of the diaphragm 68 is preferably an elongated circle, a race track shape, or an ellipse that is elongated in the longitudinal direction of the battery container 2. The diaphragm 68 includes a protrusion 68a, a ceiling portion 68d adjacent to the protrusion 68a, a side wall portion 68c adjacent to the ceiling portion 68d, and an edge portion 68b positioned at an end portion of the side wall portion 68c. The protrusion 68a, ceiling portion 68d, side wall portion 68c, and edge portion 68b are arranged in this order from the inside to outside of the battery container 2. The side wall portion 68c is an annular peripheral side wall rising from a surface of a conductive plate 63 extending parallel to the battery lid 3 that faces inside the battery can 4 toward the inside of the battery can 4. The ceiling portion 68d is a part of the diaphragm 68 adjacent to the protrusion 68a and has a convex curved surface protruding inside of the battery can 4.

The diaphragm 68 is joined to the joint portion 24d of the connection plate 24 at the protrusion 68a formed at the top portion of the convex shape thereof protruding inside the battery can 4. As illustrated in FIGS. 4A and 4B, the protrusion 68a is a portion protruding inside the battery container 2 from the top portion of the diaphragm 68 in a stepped shape. The protrusion 68a is a bottomed cylindrical portion having a hollow inside and constituted by a flat top surface and a peripheral side wall. A planar shape of the protrusion 68a corresponds to that of the diaphragm 68.

As illustrated in FIG. 4B, a top surface of the protrusion 68a is brought into contact with the joint portion 24d surrounded by the fragile portion 24c and thin portion 24b outside the joint portion 24d and joined to the joint portion 24d.

A stepped portion 68e abutting against the joint portion 24d is formed at the top surface of the protrusion 68a. The stepped portion 68e is a portion protruding inside the battery container 2 from the top surface of the protrusion 68a in a stepped shape. A height of a step between the stepped portion 68e and top surface of the protrusion 68a is set so as to cause the thin portion 24b to be slightly elastically deformed toward inside the battery container 2 in a state where the top surface of the protrusion 68a is brought into contact with the thin portion 24b outside the joint portion 24d to bring the joint portion 24d into close contact with the stepped portion 68e at a predetermined surface pressure. The height of a step between the stepped portion 68e and top surface of the protrusion 68a can be set to, for example, 100 μm or less.

The stepped portion 68e may have any planar shape, as long as it does not protrude outside the fragile portion 24c. For example, the planar shape of the stepped portion 68e may be a shape following the planar shape of the fragile portion 24c or a shape corresponding to the planar shape of the joint portion 24d. The stepped portion 68e at the top surface of the protrusion 68a is joined to the joint portion 24d by, for example, laser welding, resistance welding, or ultrasonic welding in a state where it is brought into contact with the joint portion 24d at a predetermined surface pressure.

As illustrated in FIG. 4A, the edge portion 68b of an opening of the diaphragm 68 at the outerside of the battery container 2 is joined to the conductive plate 63.

The conductive plate 63 is a flat member having a through hole through which a connection terminal 62 penetrates and has a planar shape corresponding to the planar shape of the diaphragm 68 as illustrated in FIG. 5. As illustrated in FIG. 4A, the conductive plate 63 is disposed on the lower surface of the battery lid 3 through the insulating member 65. More specifically, the conductive plate 63 is caulked to the battery lid 3 by the connection terminal 62 extending from the positive electrode external terminal 61 and is disposed inside the battery container 2. A surface of the conductive plate 63 that faces inside the battery can 4 is a flat surface having no protrusion or the like and has an annular engagement groove 63a to be engaged with the edge portion 68b of the diaphragm 68.

The diaphragm 68 is joined to the conductive plate 63 by, for example, laser welding, resistance welding, or ultrasonic welding in a state where a flange-like part of the edge portion 68b bent outward in a radial direction of the diaphragm 68 is engaged with the engagement groove 63a of the conductive plate 63. The protrusion 68a of the diaphragm 68 is joined to the joint portion 24d of the connection plate 24, and the edge portion 68b is joined to the conductive plate 63, whereby the connection plate 24 and conductive plate 63 are electrically connected to each other through the diaphragm 68. The conductive plate 63 is connected with the connection terminal 62 extending from the positive electrode external terminal 61.

As described above, the positive electrode external terminal 61 is fixed to the upper surface of the battery lid 3 through the insulating member 64 and is disposed outside the battery container 2. The positive electrode external terminal 61 is formed into a flat plate shape extending in the longitudinal direction of the battery container 2 and is connected with the connection terminal 62 at its end portion on a center side of the battery container 2 in the longitudinal direction of the battery container 2. The connection terminal 62 is integrally formed with, for example, the positive electrode external terminal 61.

The connection terminal 62 is a cylindrical member extending along a center axis penetrating the battery lid 3 and connecting the positive electrode external terminal 61 and conductive plate 63. The connection terminal 62 is formed into a cylindrical shape having a through hole 62b formed along its center axis. In the connection terminal 62, an outer diameter of a leading end portion extending inside the battery container 2 is smaller than that of a base portion connected to the positive electrode external terminal 61. The connection terminal 62 extends inside the battery container 2 from the positive electrode external terminal 61 and penetrates through a through hole of the battery lid 3. The leading end portion of the connection terminal 62 penetrates through the through hole of the conductive plate 63 disposed inside the battery container 2 and is then caulked at its tip end, to form a caulking portion 62a.

With the above configuration, the connection terminal 62 integrally fixes the positive electrode external terminal 61, battery lid 3, and conductive plate 63 to each other with the insulating members 64 and 65 interposed therebetween and electrically connects the positive electrode external terminal 61 and conductive plate 63. Further, in a state where the edge portion 68b of the diaphragm 68 is joined to the conductive plate 63, a space between the diaphragm 68 and conductive plate 63 is isolated from an inner space of the battery container 2. The space between the diaphragm 68 and conductive plate 63 communicates with an external space of the battery container 2 through the through hole 62b of the connection terminal 62.

The positive electrode external terminal 61 is disposed on the upper surface of the battery lid 3 through the insulating member 64 and is electrically insulated from the battery lid 3. The insulating member 64 has a concave portion 64a to be engaged with the positive electrode external terminal 61 and an opening portion 64b through which the through hole of the battery lid 3 is exposed. The connection terminal 62 and battery lid 3 are electrically insulated from each other by a gasket 66. The gasket 66 is formed into a cylindrical shape and has, at its one end portion, a flange-like portion extending in a radial direction thereof. The insulating member 64 and gasket 66 are each produced by using, e.g., a resin material having an insulating property.

With the above configuration, the positive electrode collector plate 21 and positive electrode external terminal 61 are electrically connected to each other through the connection plate 24, diaphragm 68, conductive plate 63, and connection terminal 62. That is, a current path between the positive electrode collector plate 21 and positive electrode external terminal 61 is constituted by the connection plate 24, diaphragm 68, conductive plate 63 and connection terminal 62, and the current interrupting portion 60 mainly constituted by the connection plate 24 and diaphragm 68 is disposed in this current path. The positive electrode collector plate 21, connection plate 24, diaphragm 68, conductive plate 63, connection terminal 62, and positive electrode external terminal 61 are each produced by using, for example, aluminum or an aluminum alloy.

The members illustrated in FIG. 4A can be assembled in the following procedures. First, the insulating member 64 and gasket 66 are positioned and disposed on the upper surface of the battery lid 3 such that the through hole of the battery lid 3 is exposed to the opening portion 64b of the insulating member 64 and that the cylindrical portion of the gasket 66 is inserted into the through hole of the battery lid 3. Then, the connection terminal 62 is inserted through the cylindrical portion of the gasket 66 to make the connection terminal 62 penetrate through the through hole of the battery lid 3. Further, the positive electrode external terminal 61 is engaged with the concave portion of the insulating member 64.

Then, the insulating member 65 is positioned and disposed on the lower surface of the battery lid 3, and the leading end portion of the connection terminal 62 is inserted through a through hole of the insulating member 65. Further, the leading end portion of the connection terminal 62 is inserted through the through hole of the conductive plate 63 and is plastically deformed so as to be expanded in diameter, whereby the caulking portion 62a is formed. As a result, the positive electrode external terminal 61, insulating members 64 and 65, battery lid 3, gasket 66, and conductive plate 63 are integrally caulked and fixed to each other. The positive electrode external terminal 61 and conductive plate 63 are electrically connected to each other by the connection terminal 62 and electrically insulated from the battery lid 3 by the insulating members 64 and 65 and gasket 66.

Then, the edge portion 68b of the diaphragm 68 is engaged with and welded to the engagement groove 63a of the conductive plate 63, and the fixation convex portions 65a of the insulating member 65 protruded from the lower surface of the battery lid 3 are inserted into and heat-welded to the fixing holes 22a and 24e of the base portion 22 of the positive electrode collector plate 21 and connection plate 24. Further, the top surface of the protrusion 68a of the diaphragm 68 is welded to the joint portion 24d of the connection plate 24. As a result, the positive electrode collector plate 21 is integrally fixed to the battery lid 3 through the insulating member 65 and diaphragm 68. Further, the positive electrode collector plate 21 and conductive plate 63 are electrically connected through the connection plate 24 and diaphragm 68, and the positive electrode collector plate 21 is electrically insulated from the battery lid 3 by the insulating member 65.

Although not illustrated, the same connection terminal as that connected to the positive electrode external terminal 61 is connected to the negative electrode external terminal 71; however, on the negative electrode side, the connection plate, conductive plate, and diaphragm are not disposed. On the negative electrode side, a leading end of the connection terminal extending from the negative electrode external terminal 71 is inserted through the gasket and through hole of the base portion of the negative electrode collector plate 31. Further, the leading end of the connection terminal is caulked to form a caulking portion, whereby the negative electrode external terminal 71, insulating member 74 and 75, gasket, battery lid 3, and negative electrode collector plate 31 are integrally caulked and fixed to each other. Further, the negative electrode external terminal 71 and negative electrode collector plate 31 are electrically connected to each other by the connection terminal and electrically insulated from the battery lid 3 by the insulating member and gasket.

With the above procedure, the lid assembly 10 illustrated in FIG. 2 is formed. Further, the foil exposed portions 41b and 42b at both ends of the rolled electrode group 40 in the roll axis direction are bundled and joined to the joint pieces 21a and 31a of the positive- and negative-electrode collector plates 21 and 31, respectively, whereby the power generating element 50 is formed. The power generating element 50 is inserted inside the battery can 4 through the opening portion 4a of the battery can 4, and the battery lid 3 is welded to the opening portion 4a of the battery can 4. Then, a non-aqueous electrolyte solution is injected inside the battery container 2 through the injection hole 11, and the injection plug is welded to the injection hole 11 to seal the battery container 2, whereby the rectangular secondary battery 1 illustrated in FIG. 1 is obtained.

The following describes effects of the rectangular secondary battery 1 according to the present embodiment.

As illustrated in FIG. 4A, in the rectangular secondary battery 1, the space between the diaphragm 68 and conductive plate 63 is made to communicate with an external space of the battery container 2 through the through hole 62b of the connection terminal 62. Therefore, when a pressure inside the battery container 2 is increased due to, for example, overcharge, excessive temperature rise, or breakage by an external force in the rectangular secondary battery 1, a pressure applied to a surface of the diaphragm 68 that faces inside the battery container 2 becomes higher than a pressure applied to a surface thereof that faces outside the battery container 2. As a result, a stress that deforms the diaphragm 68 toward outside the battery container 2 from the inside thereof is applied to the diaphragm 68; however, the convex shape of the diaphragm 68 that protrudes inside the battery container 2 is almost kept until the pressure reaches a predetermined value.

When the internal pressure of the battery container 2 is further increased to reach a prescribed value, the diaphragm 68 is plastically deformed (for example, buckled), in a concave shape, toward outside the battery container 2. At this time, since the diaphragm 68 is joined, at the protrusion 68a of the top portion thereof, to the joint portion 24d of the connection plate 24, a stress in the direction toward outside the battery container 2 is applied to the joint portion 24d. Then, the stress is concentrated on the fragile portion 24c around the joint portion 24d, with the result that the thin portion 24b is ruptured with the fragile portion 24c as a starting point. This disconnects the connection between the connection plate 24 and diaphragm 68 constituting the current interrupting portion 60 to interrupt the current path between the positive electrode collector plate 21 and conductive plate 63. As a result, the current path between the rolled electrode group 40 and positive electrode external terminal 61 is interrupted, thereby ensuring safety of the rectangular secondary battery 1. Further, the plastic deformation of the diaphragm 68 in a concave shape prevents the diaphragm 68 from contacting the connection plate 24 again.

For example, in the rectangular secondary battery 1 for vehicle, at normal use before the current interrupting portion 60 is activated due to occurrence of the abnormality as described above in the rectangular secondary battery 1, the rectangular secondary battery 1 may undergo vibration or impact. When the rectangular secondary battery 1 undergoes vibration or impact, the rolled electrode group 40 supported by the positive- and negative-electrode collector plates 21 and 31 so as to be suspended from the battery lid 3 inside the battery container 2 may be vibrated or swung. In this case, a stress caused by the vibration or swing of the rolled electrode group 40 is applied to the base portion 22 of the positive electrode collector plate 21 fixed to the battery lid 3 of the battery container 2 through the insulating member 65.

For example, in the non-aqueous electrolyte secondary battery described in PTL 1, when an electrode body inside an exterior can is vibrated or swung by impact or vibration applied from outside, vibration is directly transmitted from a collector plate connecting portion of a collector tab member connected to the electrode body to an insertion portion of the collector tab member, or stress such as torsion is applied to the insertion portion of the collector tab member. Then, a fragile portion that the insertion portion of the collector tab member has may be damaged or ruptured to cause malfunction of the current interrupting mechanism.

On the other hand, the rectangular secondary battery 1 according to the present embodiment has the connecting portion 23 for connecting the connection plate 24 of the current interrupting portion 60 and base portion 22 of the positive electrode collector plate 21, and the rigidity of the connecting portion 23 is lower than that of the positive electrode collector plate 21.

As a result, a relative displacement between the base portion 22 of the positive electrode collector plate 21 and connection plate 24 is allowed by the connecting portion 23, thereby suppressing transmission of the vibration from the positive electrode collector plate 21 to connection plate 24. In addition, stress to be applied from the base portion 22 of the positive electrode collector plate 21 to the connection plate 24 is reduced, thereby preventing connection between the connection plate 24 and diaphragm 68 from being disconnected by an external factor such as vibration or impact. Thus, according to the present embodiment, there can be provided the rectangular secondary battery 1 excellent in vibration resistance and impact resistance and capable of stably and reliably interrupting the current path upon increase in the internal pressure of the battery container.

Further, in the present embodiment, the thickness of the connecting portion 23 is made smaller than that of the base portion 22 of the positive electrode collector plate 21, whereby the rigidity of the connecting portion 23 is lower than that of the positive electrode collector plate 21. Thus, the positive electrode collector plate 21, connecting portion 23, and connection plate 24 can be integrally formed of the same material. This facilitates production of the positive electrode collector plate 21, connecting portion 23, and connection plate 24, making it possible to improve product yield and productivity and to reduce production cost.

Further, the connection plate 24 is fixed, at a portion thereof between the joint portion 24d to be joined to the diaphragm 68 and connecting portion 23, to the battery lid 3 of the battery container 2 through the insulating member 65. As a result, even if vibration or stress is applied from the connecting portion 23 to the connection plate 24, the influence of the application of vibration or stress on the joint portion 24d can be suppressed. This can prevent the joint portion 24d and fragile portion 24c around the joint portion 24d from being damaged or ruptured to thereby increase vibration resistance and impact resistance of the current interrupting portion 60.

Further, the end portion of the base portion 22 of the positive electrode collector plate 21 adjacent to one end portion of the connecting portion 23 and end portion of the connection plate 24 adjacent to the other end portion of the connecting portion 23 are individually fixed to the battery lid 3 of the battery container 2 through the insulating member 65. This reduces vibration or stress transmitted from the base portion 22 of the positive electrode collector plate 21 to the connecting portion 23 to further reduce vibration or stress transmitted from the connecting portion 23 to connection plate 24, thereby making it possible to suppress the influence of the vibration or stress on the joint portion 24d and fragile portion 24c more effectively.

Further, the rigidity of the connection plate 24 is higher than that of the connecting portion 23, so that the connecting portion 23 having the lowest rigidity with respect to the positive electrode collector plate 21 is easiest to deform. This prevents the connection plate 24 from being deformed by the stress received from the connecting portion 23. Further, the thickness T4 of the connection plate 24 is larger than the thickness T3 of the connecting portion 23, which increases strength between the joint portion 24d and diaphragm 68 and between the fragile portion 24c and diaphragm 68 to prevent connection between the diaphragm 68 and connection plate 24 from being disconnected by vibration or stress transmitted from the connecting portion 23 to connection plate 24.

Further, the connecting portion 23 has the bent portion 23a and is thus easily deformed in various directions as compared to a case where it is formed into a flat shape or a linear shape with the same thickness T3, thereby making a relative displacement between the base portion 22 of the positive electrode collector plate 21 and connection plate 24 easier. Thus, vibration to be transmitted from the base portion 22 of the positive electrode collector plate 21 to the connection plate 24 can be absorbed, and impact and stress to be transmitted from the base portion 22 of the positive electrode collector plate 21 to the connection plate 24 can be reduced, whereby the influence of the vibration or impact and stress on the joint portion 24d and fragile portion 24c can be suppressed more effectively.

Further, the gap G1 between the base portion 22 of the positive electrode collector plate 21 and battery lid 3 is smaller than the gap G2 between the connection plate 24 and battery lid 3. Accordingly, a height direction distance of the battery container 2 is generated between the base portion 22 of the positive electrode collector plate 21 and connection plate 24, thus making it possible to increase a length of the connecting portion 23 extending from the base portion 22 of the positive electrode collector plate 21 to the connection plate 24. In addition, formation of the bent portion 23a in the connecting portion 23 is facilitated. Thus, vibration to be transmitted from the base portion 22 of the positive electrode collector plate 21 to the connection plate 24 can be absorbed more effectively, and impact and stress to be transmitted from the base portion 22 of the positive electrode collector plate 21 to the connection plate 24 can be reduced.

Further, the thickness T3 of the connecting portion 23 is uniform between the base portion 22 of the positive electrode collector plate 21 and connection plate 24. This can prevent local stress from being applied to the connecting portion 23 when vibration transmitted from the base portion 22 of the positive electrode collector plate 21 to the connection plate 24 is absorbed by the connecting portion 23 or impact and stress transmitted from the base portion 22 of the positive electrode collector plate 21 to the connection plate 24 is reduced by the connecting portion 23, thereby making it possible to prevent the connecting portion 23 from being ruptured.

Further, the diaphragm 68 has a bowl shape and formed so as to protrude inside the battery container 2, so that it is possible to increase strength of the diaphragm 68 against a pressure that deforms the diaphragm 68 toward outside the battery container 2, as compared to a case where the diaphragm 68 is formed into a flat plate shape. This can prevent occurrence of such malfunction of the current interrupting portion 60 that the diaphragm 68 is deformed by a pressure lower than a predetermined internal pressure.

Further, the diaphragm 68 is joined, at the protrusion 68a of the top portion thereof, to the joint portion 24d. The diaphragm 68 has the protrusion 68a at the top portion thereof, as described above, and thereby the top portion of the diaphragm 68 is reinforced by a peripheral side wall of the protrusion 68a. This allows the top surface of the protrusion 68a and joint portion 24d to be joined to each other in a state where the top surface of the protrusion 68a is pressed against the joint portion 24d at a predetermined surface pressure.

Further, the stepped portion 68e abutting against the joint portion 24d is formed at the top surface of the protrusion 68a. With this configuration, the thin portion 24b is slightly elastically deformed toward inside the battery container 2 to bring the joint portion 24d into close contact with the stepped portion 68e at a predetermined surface pressure. By joining the top surface of the protrusion 68a and joint portion 24d to each other in a state where the top surface of the protrusion 68a is pressed against the joint portion 24d at a predetermined surface pressure, joining strength between the top surface of the protrusion 68a and joint portion 24d can be increased.

Further, the connection plate 24 connected to the base portion 22 of the positive electrode collector plate 21 has the joint portion 24d and fragile portion 24c formed around the joint portion 24d so as to be recessed in the thickness direction of the connection plate 24, and the protrusion 68a of the diaphragm 68 is joined to the joint portion 24d. Thus, upon deformation of the diaphragm 68, stress can be concentrated on the fragile portion 24c of the thin portion 24b, thereby allowing the thin portion 24b to be ruptured easily and reliably with the fragile portion 24c as a starting point.

Further, the rectangular secondary battery 1 has the conductive plate 63 to be joined to the edge portion 68b of the diaphragm 68 and the connection terminal 62 electrically connecting the conductive plate 63 and positive electrode external terminal 61. This allows formation of a space between the conductive plate 63 and connection plate 24, thereby allowing the diaphragm 68 to be disposed in this space. Further, by joining the conductive plate 63 and edge portion 68b of the diaphragm 68, the internal space of the battery container 2 can be sealed by the diaphragm 68, and by making a space between the conductive plate 63 and diaphragm 68 communicate with an external space through the through hole of the connection terminal 62, the diaphragm 68 can be deformed toward outside the battery can 4 upon increase in the internal pressure inside the battery container 2.

Further, the material of the connection plate 24 is aluminum or an aluminum alloy, so that when the internal pressure inside the battery container 2 is increased to exceed a predetermined value, the fragile portion 24c around the joint portion 24d can be easily ruptured as compared to a case where the connection plate 24 is formed of a metal having a comparatively high strength, such as copper. Thus, when the internal pressure inside the battery container 2 reaches a predetermined value, the current path between the positive electrode external terminal 61 and positive electrode collector plate 21 can be stably and reliably interrupted.

Further, the material of the connecting portion 23 is aluminum or an aluminum alloy, so that the connecting portion 23 is more easily deformed than other metal materials having comparatively high strength, such as copper, whereby a relative displacement between the positive electrode collector plate 21 and connection plate 24 can be made more allowable. Thus, vibration and stress transmitted from the positive electrode collector plate 21 to connection plate 24 can be absorbed and reduced more effectively.

Further, the caulking portion 62a at the leading end of the connection terminal 62 is formed by using a tool having an outer shape larger than an outer diameter of the caulking portion 62a. Thus, when the conductive plate 63 has a structure such as a convex body on a surface thereof that faces inside the battery can 4, the structure on the conductive plate 63 interferes with the tool, which may prevent a sufficient dimension of the caulking portion 62a from being ensured. In this case, a sufficient caulking strength may not be obtained by the connection terminal 62.

On the other hand, in the rectangular secondary battery 1 according to the present embodiment, the surface of the conductive plate 63 that faces inside the battery container 2 is a flat surface having no protrusion, so that there does not occur the problem that the structure on the conductive plate 63 interferes with the tool when the leading end of the connection terminal 62 is caulked to form the caulking portion 62a. Thus, it is possible to ensure a sufficiently large dimension for the caulking portion 62a to prevent the caulking strength by the connection terminal 62 from being reduced.

Further, the diaphragm has a shape elongated in the longitudinal direction of the battery container 2 in a plan view, so that even when the short direction dimension of the diaphragm 68 is restricted by the short direction dimension of the battery container 2, it is possible to ensure a sufficient surface area of the diaphragm 68 by increasing the longitudinal direction dimension of the diaphragm 68 which is comparatively less strict on a restriction of a dimension. Thus, the diaphragm 68 is stably and reliably deformed upon increase in the internal pressure of the battery container 2, allowing the current path of the rectangular secondary battery 1 to be stably and reliably interrupted by the current interrupting portion 60.

As described above, according to the rectangular secondary battery 1 of the present embodiment, it is possible to increase the vibration resistance and impact resistance than before and to stably and reliably interrupt the current path upon increase in the internal pressure inside the battery container 2.

In the present embodiment, a case has been described in which the positive electrode collector plate 21, connecting portion 23, and connection plate 24 are integrally formed of the same material by forging. However, the positive electrode collector plate 21, connecting portion 23, and connection plate 24 need not be formed integrally, and a configuration may be employed in which at least one of the positive electrode collector plate 21 and connection plate 24 is produced as a separate member from the connecting portion 23, followed by joining by laser welding, resistance welding, or ultrasonic welding.

In this case, by forming the connecting portion 23 using a material having flexibility, such as a metal foil or a lead frame, the rigidity of the connecting portion 23 can be made lower than that of the positive electrode collector plate 21, and the rigidity of the connection plate 24 can be made higher than that of the connecting portion 23. When the positive electrode collector plate 21, connection plate 24, and connecting portion 23 are produced as separate members from each other as described above, the optimum material can be selected for each member depending on the purpose.

Further, when an elastic coefficient of the material of the connecting portion 23 is lower than those of the materials of the positive electrode collector plate 21 and connection plate 24, the thickness T3 of the connecting portion 23 may be made equal to the thickness T2 of the base portion 22 of the positive electrode collector plate 21 and thickness T4 of the connection plate 24.

Further, in the present embodiment, a case has been described in which the longitudinal direction both ends of the connection plate 24 are fixed to the battery lid 3 of the battery container 2 through the insulating member 65. Alternatively, however, a configuration may be employed in which the one end portion of the connection plate 24 adjacent to the connecting portion 23 in the longitudinal direction is fixed, while the other end portion of the connection plate 24 may not be fixed and may be formed as a free end. This allows stress, such as torsion, applied to the connection plate 24 to escape to thereby reduce stress to be applied to the joint portion 24d.

Further, in the present embodiment, the fragile portion 24c is formed around the joint portion 24d to be joined with the top portion of the diaphragm 68. However, the connection between the diaphragm 68 and connection plate 24 is not particularly limited as long as the connection between them is disconnected by the deformation of the diaphragm 68.

For example, a configuration may be employed in which the annular groove as the fragile portion 24c is not formed in the thin portion 24b of the connection plate 24, but the thin portion 24b itself is used as the fragile portion. In this case, the top portion of the diaphragm 68 may be joined to the thin portion 24b. In this configuration, the thin portion 24b is ruptured by the deformation of the diaphragm 68 to disconnect the connection between the top portion of the diaphragm 68 and connection plate 24. Further, another configuration may be employed in which the concave portion 24a and thin portion 24b are not formed in the connection plate 24, but a welding joint portion may be formed between the top portion of the diaphragm 68 and a surface of the connection plate 24 that faces outside the battery container 2. In this case, the welding joint portion is ruptured by the deformation of the diaphragm 68 to disconnect the connection between the top portion of the diaphragm 68 and connection plate 24.

Further, in the rectangular secondary battery 1 according to the present embodiment, a case has been described in which the insulating member 65, positive electrode collector plate 21, and connection plate 24 are integrally fixed to each other by heat welding. However, the positive electrode collector plate 21 and connection plate 24 may be joined to the insulating member 65 by using screws, rivets, or an adhesive. This increases joining strength.

Further, although the current interrupting mechanism is provided on the positive electrode side in the rectangular secondary battery 1 according to the present embodiment, it may be provided on the negative electrode side.

Figure 6:
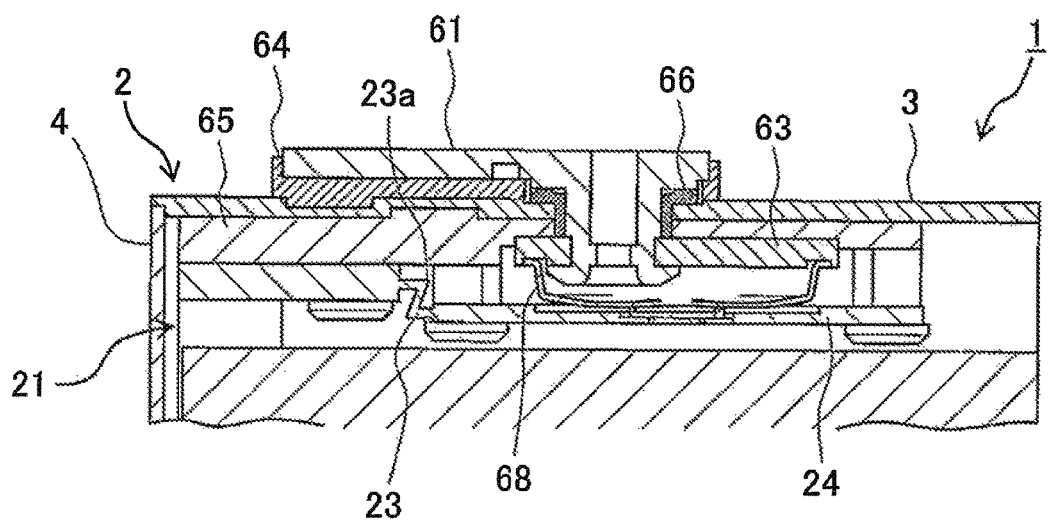
FIG. 6 is an enlarged cross-sectional view illustrating a first modification of the current interrupting portion illustrated in FIG. 4A.

Further, in the present embodiment, the connecting portion 23 has the bent portion 23a bent in a thickness direction thereof into an S-shape. However, the connecting portion 23 need not always be formed into a smooth curved shape as long as it is bent in the thickness direction. FIG. 6 is an enlarged cross-sectional view illustrating a first modification of the connecting portion 23, which corresponds to FIG. 4A.

In the first modification of the connecting portion 23 illustrated in FIG. 6, the connecting portion 23 has the bent portion 23a bent in the thickness direction; however, in a cross-sectional view, the connecting portion 23 is constituted of only a linear portion and is bent in a Z-shape. Even when the connecting portion 23 has such a shape that is constituted of only a linear portion, the same effects as those obtained by the above-described connecting portion 23 having a curved shape can be obtained.

Figure 7:
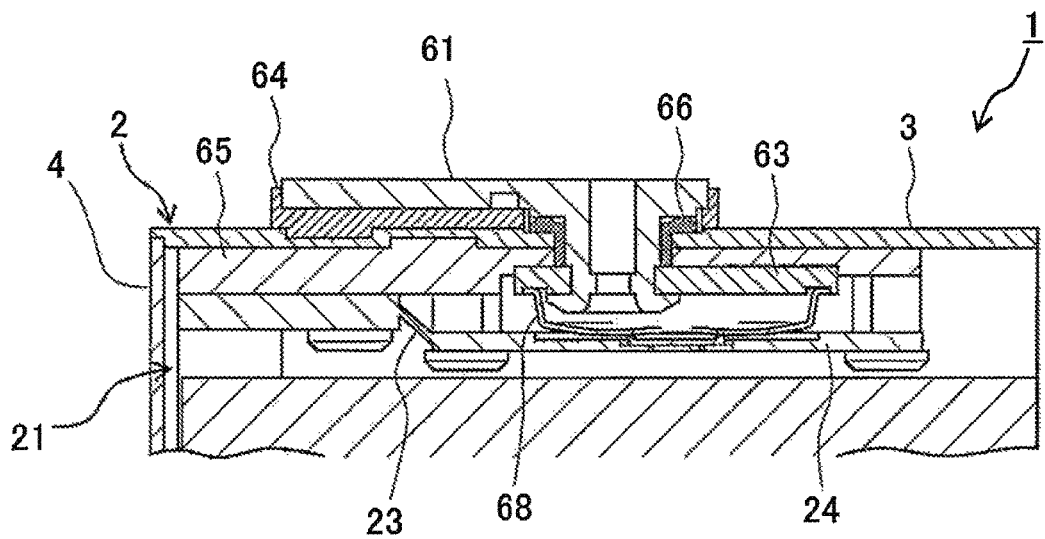
FIG. 7 is an enlarged cross-sectional view illustrating a second modification of the current interrupting portion illustrated in FIG. 4A.

Further, although the connecting portion 23 has the bent portion 23a in the present embodiment, it may be formed into a flat shape or linear shape in a cross-sectional view, not having the bent portion 23a. FIG. 7 is an enlarged cross-sectional view illustrating a second modification of the connecting portion 23, which corresponds to FIG. 4A.

In the second modification of the connecting portion 23 illustrated in FIG. 7, the connecting portion 23 is formed into a flat shape not having the bent portion 23a and into a linear shape inclined in a height direction of the battery container 2 in a cross-sectional view. Even when the connecting portion 23 has such a shape that is constituted of only a linear portion and that does not have the bent portion 23a, the same effects as those obtained by the above-described connecting portion 23 having a curved shape can be obtained. Further, production of such a linear-shaped connecting portion 23 can be facilitated as compared to the connecting portion 23 having the bent portion 23a.

Figure 8:
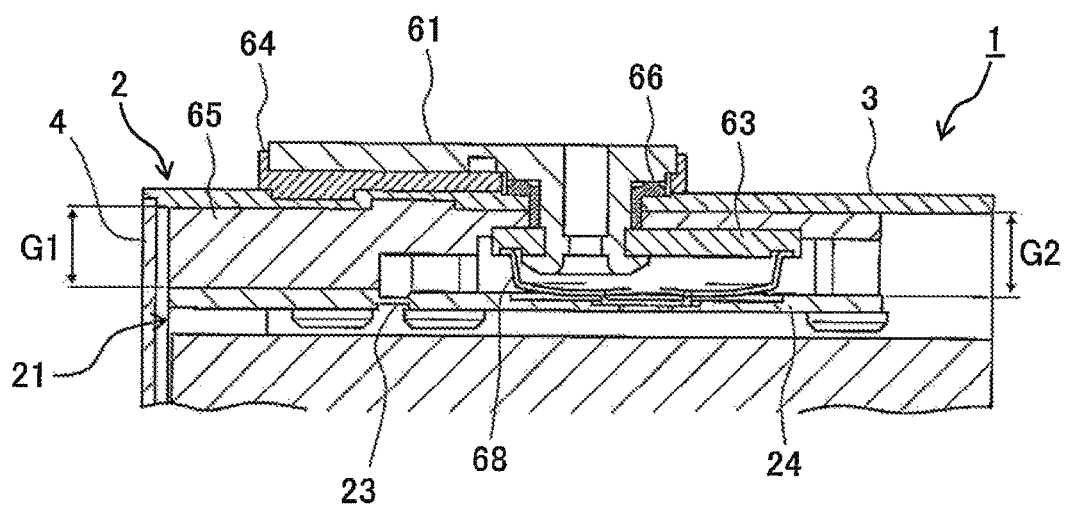
FIG. 8 is an enlarged cross-sectional view illustrating a third modification of the current interrupting portion illustrated in FIG. 4A.
Figure 9:
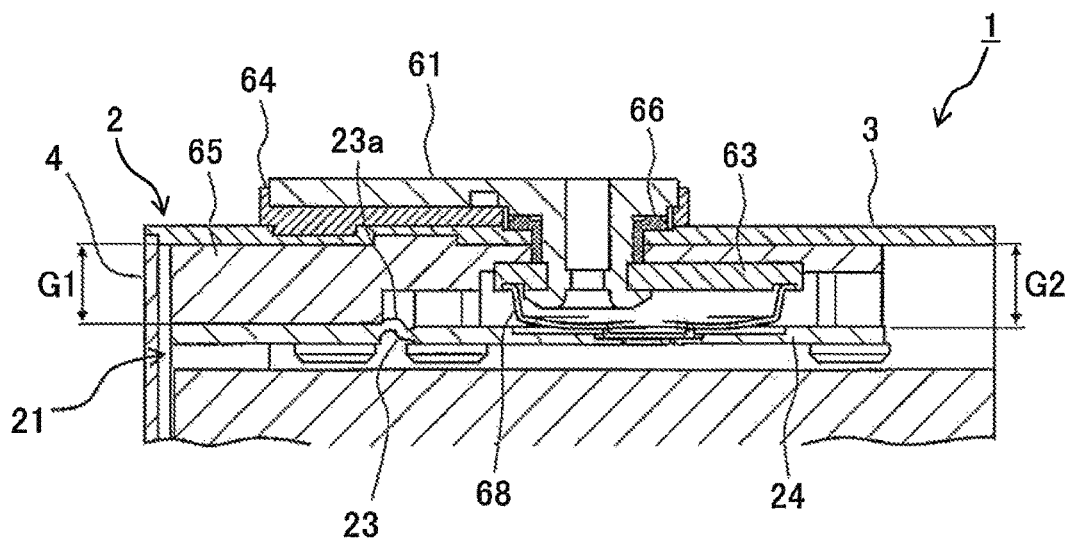
FIG. 9 is an enlarged cross-sectional view illustrating a fourth modification of the current interrupting portion illustrated in FIG. 4A.

Further, in the present embodiment, a case has been described in which the gap G1 between the positive electrode collector plate 21 and battery lid 3 is smaller than the gap G2 between the connection plate 24 and battery lid 3. However, the gap G1 between the positive electrode collector plate 21 and battery lid 3 and the gap G2 between the connection plate 24 and battery lid 3 may be made equal to each other. FIGS. 8 and 9 are enlarged cross-sectional views illustrating third and fourth modifications of the connecting portion 23, respectively, which correspond to FIG. 4A.

In the third modification of the connecting portion 23 illustrated in FIG. 8, the connecting portion 23 is formed into a flat shape not having the bent portion 23a and into a linear shape extending parallel to the battery lid 3 in a cross-sectional view. When the gap G1 between the positive electrode collector plate 21 and battery lid 3 and the gap G2 between the connection plate 24 and battery lid 3 are equal to each other, and the connecting portion 23 is formed into a linear shape extending parallel to the battery lid 3 in a cross-sectional view, there is no need to form a step between the positive electrode collector plate 21 and connection plate 24, thereby making it possible to facilitate production of the collector plate 21, bent portion 23a, and connection plate 24.

In the fourth modification of the connecting portion 23 illustrated in FIG. 9, the connecting portion 23 is formed into a U-shape in a cross-sectional view having a bent portion 23a bent in the height direction of the battery container 2. When the gap G1 between the positive electrode collector plate 21 and battery lid 3 and the gap G2 between the connection plate 24 and battery lid 3 are equal to each other, and the connecting portion 23 has the bent portion 23a bent in the height direction of the battery container 2, not only the same effects as those in the third modification of the connecting portion 23 illustrated in FIG. 8 can be obtained, but also the connecting portion 23 is easily deformed in a direction parallel to the battery lid 3.

Figure 10A:
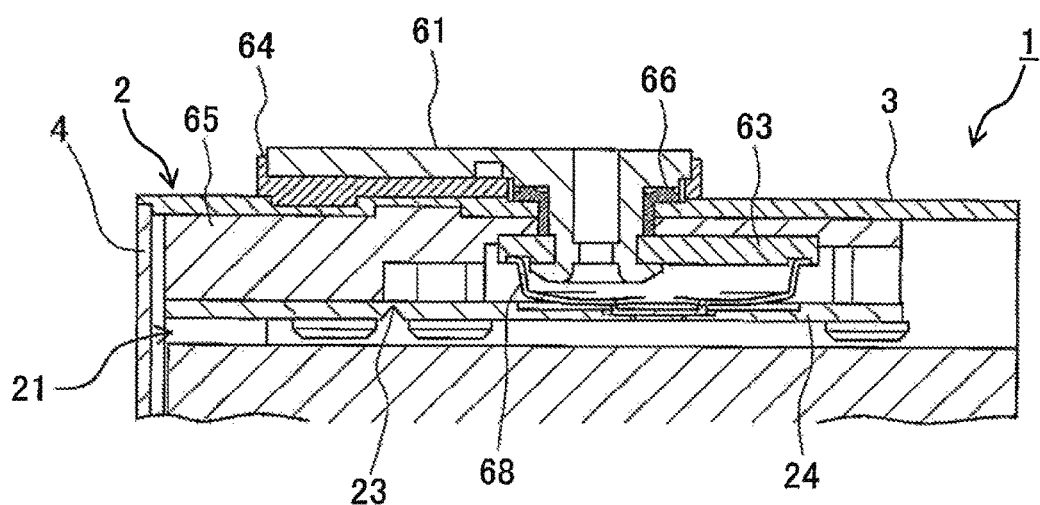
FIG. 10A is an enlarged cross-sectional view illustrating a fifth modification of the current interrupting portion illustrated in FIG. 4A.
Figure 10B:
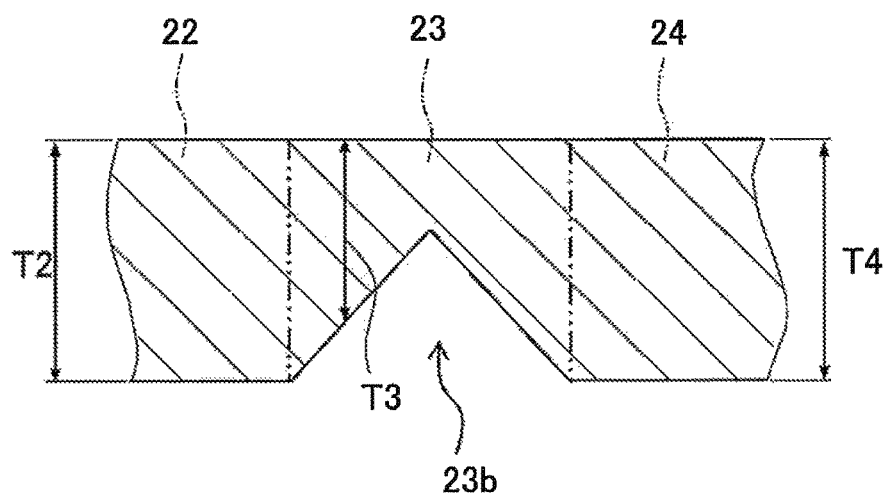
FIG. 10B is an enlarged cross-sectional view illustrating a connecting portion of the current interrupting portion illustrated in FIG. 10A.

Further, in the present embodiment, the thickness T3 of the connecting portion 23 is uniform between the positive electrode collector plate 21 and connection plate 24. However, the thickness T3 of the connecting portion 23 may vary between the positive electrode collector plate 21 and connection plate 24. FIG. 10A is an enlarged cross-sectional view illustrating a fifth modification of the connecting portion 23, which corresponds to FIG. 4A. FIG. 10B is an enlarged cross-sectional view illustrating in an enlarge manner the connecting portion 23 illustrated in FIG. 10A.

In the fifth modification of the connecting portion 23 illustrated in FIGS. 10A and 10B, the connecting portion 23 has a wedge-shaped cut portion 23b cut in a thickness direction thereof. Formation of the cut portion 23b makes the thickness T3 of the connecting portion 23 smaller than the thickness T2 of the base portion 22 of the positive electrode collector plate 21 and thickness T4 of the connection plate 24. Further, the cut portion 23b has a slope inclined relatable to the thickness direction, so that the thickness T3 of the connecting portion 23 varies between the base portion 22 of the positive electrode collector plate 21 and connection plate 24. That is, the thickness T3 is smallest at an intermediate portion between the base portion 22 of the positive electrode collector plate 21 and connection plate 24 and becomes gradually larger toward the base portion 22 of the positive electrode collector plate 21 or connection plate 24.

Also in the present modification, the rigidity of the connecting portion 23 can be made lower than that of the base portion 22 of the positive electrode collector plate 21, whereby the same effects as those obtained by the connecting portion 23 according to the above-described embodiment can be obtained. Further, production of the connecting portion 23 is facilitated. The cross-sectional view of the cut portion 23b of the connecting portion 23 is not limited to the wedge shape but may be a semicircular shape, an arch shape, or a U-shape. Also in this case, the same effects can be obtained.

While the preferred embodiments of the present invention have been described, the present invention is not limited to the above-described embodiments, but includes various modifications. The above embodiments have been described in detail in order to facilitate understanding of the present invention, and the embodiments are not necessarily limited to a configuration having all constituent elements described.

REFERENCE SIGNS LIST

1 . . . rectangular secondary battery, 2 . . . battery container, 3 . . . battery lid, 4 . . . battery can, 4a . . . opening portion, 21 . . . positive electrode collector plate (collector plate), 23 . . . connecting portion, 23a . . . bent portion, 24 . . . connection plate, 24d . . . joint portion, 40 . . . rolled electrode group, 60 . . . current interrupting portion, 61 . . . positive electrode external terminal (external terminal), 62 . . . connection terminal, 62a . . . caulking portion, 62b . . . through hole, 63 . . . conductive plate, 65 . . . insulating member, 68 . . . diaphragm, 68b . . . edge portion, G1 . . . gap between collector plate and battery lid, G2 . . . gap between connection plate and battery lid, T2 . . . thickness of collector plate, T3 . . . thickness of connecting portion

The invention claimed is:

1. A rectangular secondary battery comprising:
a current interrupting portion disposed in a current path between a collector plate connected to a rolled electrode group and an external terminal disposed outside a battery container and configured to interrupt the current path when an internal pressure of the battery container is increased, wherein
the current interrupting portion has a diaphragm electrically connected to the external terminal and deformed when the internal pressure of the battery container is increased, a connection plate connected to the diaphragm and disconnected from the diaphragm by the deformation of the diaphragm, and a connecting portion connecting the connection plate and the collector plate,
a rigidity of the connecting portion is lower than that of the collector plate, and
a thickness of the connecting portion is smaller than that of the collector plate;
wherein the connection plate is fixed, at a portion thereof between a joint portion to be joined to the diaphragm and the connecting portion, to the battery container through an insulating member.

2. The rectangular secondary battery according to claim 1, wherein
an end portion of the collector plate and an end portion of the connection plate adjacent to the connecting portion are fixed to the battery container through the insulating member.

3. The rectangular secondary battery according to claim 2, wherein
the battery container has a battery can and a battery lid that seals an opening portion of the battery can, wherein
the collector plate and connection plate are fixed to the battery lid through the insulating member, and
a gap between the collector plate and battery lid is smaller than that between the connection plate and battery lid.

4. The rectangular secondary battery according to claim 1, wherein
the thickness of the connecting portion varies between the collector plate and connection plate.

5. A rectangular secondary battery comprising:
a current interrupting portion disposed in a current path between a collector plate connected to a rolled electrode group and an external terminal disposed outside a battery container and configured to interrupt the current path when an internal pressure of the battery container is increased, wherein
the current interrupting portion has a diaphragm electrically connected to the external terminal and deformed when the internal pressure of the battery container is increased, a connection plate connected to the diaphragm and disconnected from the diaphragm by the deformation of the diaphragm, and a connecting portion connecting the connection plate and the collector plate,
a rigidity of the connecting portion is lower than that of the collector plate, and
a thickness of the connecting portion is smaller than that of the collector plate;
wherein the thickness of the connecting portion is uniform between the collector plate and connection plate; and
wherein the connecting portion has a bent portion bent in a thickness direction thereof.

6. A rectangular secondary battery comprising:
a current interrupting portion disposed in a current path between a collector plate connected to a rolled electrode group and an external terminal disposed outside a battery container and configured to interrupt the current path when an internal pressure of the battery container is increased, wherein
the current interrupting portion has a diaphragm electrically connected to the external terminal and deformed when the internal pressure of the battery container is increased, a connection plate connected to the diaphragm and disconnected from the diaphragm by the deformation of the diaphragm, and a connecting portion connecting the connection plate and the collector plate,
a rigidity of the connecting portion is lower than that of the collector plate;
a thickness of the connecting portion is smaller than that of the collector plate;
a conductive plate joined to an edge portion of the diaphragm; and
a connection terminal connecting the conductive plate and external terminal, wherein
the connection terminal extends from the external terminal and penetrates through the conductive plate and has a caulking portion at a leading end thereof on the conductive plate side and a through hole through which a space between the diaphragm and conductive plate communicates with an external space of the battery container.

7. The rectangular secondary battery according to claim 1, wherein
at least one of the collector plate and connection plate and the connecting portion are formed as separate members and are joined and connected to each other.

8. The rectangular secondary battery according to claim 1, wherein
a material of the connecting portion is aluminum or an aluminum alloy.

* * * * *